US011227128B2

(12) United States Patent
Min et al.

(10) Patent No.: US 11,227,128 B2
(45) Date of Patent: Jan. 18, 2022

(54) LINGUISTICALLY RICH CROSS-LINGUAL TEXT EVENT EMBEDDINGS

(71) Applicant: Raytheon BBN Technologies Corp., Cambridge, MA (US)

(72) Inventors: Bonan Min, Cambridge, MA (US); Yee Seng Chan, Winchester, MA (US); Ilana Heintz, Silver Spring, MD (US)

(73) Assignee: Raytheon BBN Technologies Corp., Cambridge, MA (US)

(*) Notice: Subject to any disclaimer, the term of this patent is extended or adjusted under 35 U.S.C. 154(b) by 149 days.

(21) Appl. No.: 16/434,710

(22) Filed: Jun. 7, 2019

(65) Prior Publication Data
US 2020/0387574 A1    Dec. 10, 2020

(51) Int. Cl.
| | |
|---|---|
| *G06F 40/00* | (2020.01) |
| *G06F 40/58* | (2020.01) |
| *G06N 20/00* | (2019.01) |
| *G06F 40/253* | (2020.01) |
| *G06F 40/30* | (2020.01) |
| *G06N 3/04* | (2006.01) |

(52) U.S. Cl.
CPC ............ *G06F 40/58* (2020.01); *G06F 40/253* (2020.01); *G06F 40/30* (2020.01); *G06N 3/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,162,813 | B2* | 12/2018 | Sarikaya | G06F 40/35 |
| 10,262,654 | B2* | 4/2019 | Hakkani-Tur | G06F 40/35 |
| 10,339,916 | B2* | 7/2019 | Sarikaya | G06N 3/006 |

(Continued)

FOREIGN PATENT DOCUMENTS

WO    WO-2020247616 A1    12/2020

OTHER PUBLICATIONS

Hsi, Andrew, et al. "Leveraging multilingual training for limited resource event extraction." Proceedings of COLING 2016, the 26th International Conference on Computational Linguistics: Technical Papers. 2016. (Year: 2016).*

(Continued)

*Primary Examiner* — Seong-Ah A Shin
(74) *Attorney, Agent, or Firm* — Schwegman Lundberg & Woessner, P.A.

(57) ABSTRACT

A machine accesses a preexisting set of natural language text documents in multiple natural languages. Each natural language text document in at least a portion of the preexisting set is associated with an event. The machine trains, using the preexisting set of natural language text documents and the associated events, an event encoder to learn associations between texts and event annotations. The event encoder leverages a parser in each of the two or more natural languages. The machine generates, using the event encoder, new event annotations for texts. The machine trains, using the preexisting set of natural language text documents and the new event annotations for the texts generated by the event encoder, an event extraction engine to extract events from natural language texts in the two or more natural languages. The event extraction engine leverages the parser in each of the two or more natural languages.

22 Claims, 9 Drawing Sheets

(56) References Cited

U.S. PATENT DOCUMENTS

| | | | | |
|---|---|---|---|---|
| 10,380,243 B2* | 8/2019 | Cheng | | G06F 40/268 |
| 10,380,259 B2* | 8/2019 | Lee | | G06F 40/30 |
| 10,540,547 B2* | 1/2020 | Lee | | G06K 9/6274 |
| 10,546,233 B1* | 1/2020 | Bhattacharyya | | G06N 3/063 |
| 10,628,522 B2* | 4/2020 | Hosokawa | | G06F 40/284 |
| 10,657,332 B2* | 5/2020 | Zhang | | G06F 40/49 |
| 10,685,358 B2* | 6/2020 | Coman | | G06N 20/00 |
| 10,769,374 B1* | 9/2020 | Chen | | G06N 3/0445 |
| 10,769,383 B2* | 9/2020 | Cao | | G06N 3/08 |
| 2016/0350288 A1* | 12/2016 | Wick | | G06F 40/242 |

OTHER PUBLICATIONS

Zhu, Zhu, et al. "Bilingual event extraction: a case study on trigger type determination." Proceedings of the 52nd Annual Meeting of the Association for Computational Linguistics (vol. 2: Short Papers). 2014. (Year: 2014).*

Feng, Xiaocheng, Bing Qin, and Ting Liu. "A language-independent neural network for event detection." Science China Information Sciences 61.9 (2018): 1-12. (Year: 2018).*

Faruqui, Manaal, and Chris Dyer. "Improving vector space word representations using multilingual correlation." Proceedings of the 14th Conference of the European Chapter of the Association for Computational Linguistics. 2014. (Year: 2014).*

"International Application Serial No. PCT/US2020/036104, International Search Report dated Sep. 2, 2020", 6 pgs.

"International Application Serial No. PCT/US2020/036104, Written Opinion dated Sep. 2, 2020", 7 pgs.

Adams, Oliver, et al., "Cross-Lingual Word Embeddings for Low-Resource Language Modeling", Proceedings of the 15th Conference of the European Chapter of the Association for Computational Linguistics: vol. 1, Long Papers, (2017), 937-947.

Chen. Zheng, et al., "Can one Language Bootstrap the other: A Case Study on Event Extraction", Semi-Supervised Learning for Natural Language Processing, (2009), 66-74.

Hsi, Andrew, et al., "Leveraging Multilingual Training for Limited Resource Event Extraction", Proceedings of Coling 2016, The 26th International Conference on Computational Linguistics: Technical Papers, (Dec. 11, 2016), 1201-1210.

Liu, Jian, et al., "Event Detection via Gated Multilingual Attention Mechanism", Proceedings of the Thirty-Second AAAI Conference On Artificial Intelligence, (AAAI-18), The 30th Innovative Applications of Artificial Intelligence (IAAl-18), and the 8th AAAI Symposium on Educational Advances in Artificial Intelligence (EAAI-18), (Feb. 2, 2018), 8 pgs.

Muis, Aldrian Obaja, et al., "Low-Resource Cross-lingual Event Type Detection in Documents via Distant Supervision with Minimal Effort", Proceedings of the 27th International Conference On Computational Linguistics, (Aug. 20, 2018), 70-82.

Ponti, Edoardo Maria, et al., "Modeling Language Variation and Universals: A Survey on Typological Linguistics for Natural Language Processing", arxiv.org, Cornell University Library, 201 Olin Library Cornell University Ithaca, NY 14853, (Jul. 3, 2018), 55 pgs.

Bengio, Yoshua, et al., "A neural probabilistic language model", Journal of Machine Learning Research 3, (2003), 1137-1155.

Devlin, Jacob, et al., "BERT: Pre-training of Deep Bidirectional Transformers for Language Understanding", Google. arXiv:1810.04805v1, [Online], Retrieved from the Internet: <URL: https://arxiv.org/abs/1810.04805>, (2018), 14 pgs.

Faruqui, Manaal, et al., "Improving Vector Space Word Representations using Multilingual Correlation", Proceedings of the 14th Conference of the European Chapter of the Association for Computational Linguistics, (2014), 462-471.

Mikilov, Tomas, et al., "Efficient estimation of word representations in vector space", ICLR Workshop, 2013, (May 2, 2013), 1-12.

Nguyen, Thien, et al., "Event Detection and Domain Adaptation with Convolution Neural Networks", Proceedings of the 53rd Annual Meeting of the Association for Computational Linguistics and the 7th International Joint Conference on Natural Language Processing (vol. 2: Short Papers), (2015), 365-371.

Peters, Matthew, et al., "Semi-supervised sequence tagging with bidirectional language models", arXiv:1705.00108v1 [cs.CL], (2017), 10 pgs.

* cited by examiner

US 11,227,128 B2

LINGUISTICALLY RICH CROSS-LINGUAL TEXT EVENT EMBEDDINGS

TECHNICAL FIELD

Embodiments pertain to computer architecture. Some embodiments relate to neural networks. Some embodiments relate to natural language processing. Some embodiments relate to neural networks trained to extract linguistically rich cross-lingual event embeddings.

BACKGROUND

Natural language documents may describe events in many different ways, especially if the documents are in different natural languages (e.g., English, French, Russian, Chinese, etc.). Extracting events from natural language documents may be desirable, for example, to create a repository of events or increase the searchability of the documents.

SUMMARY

Figure 1:
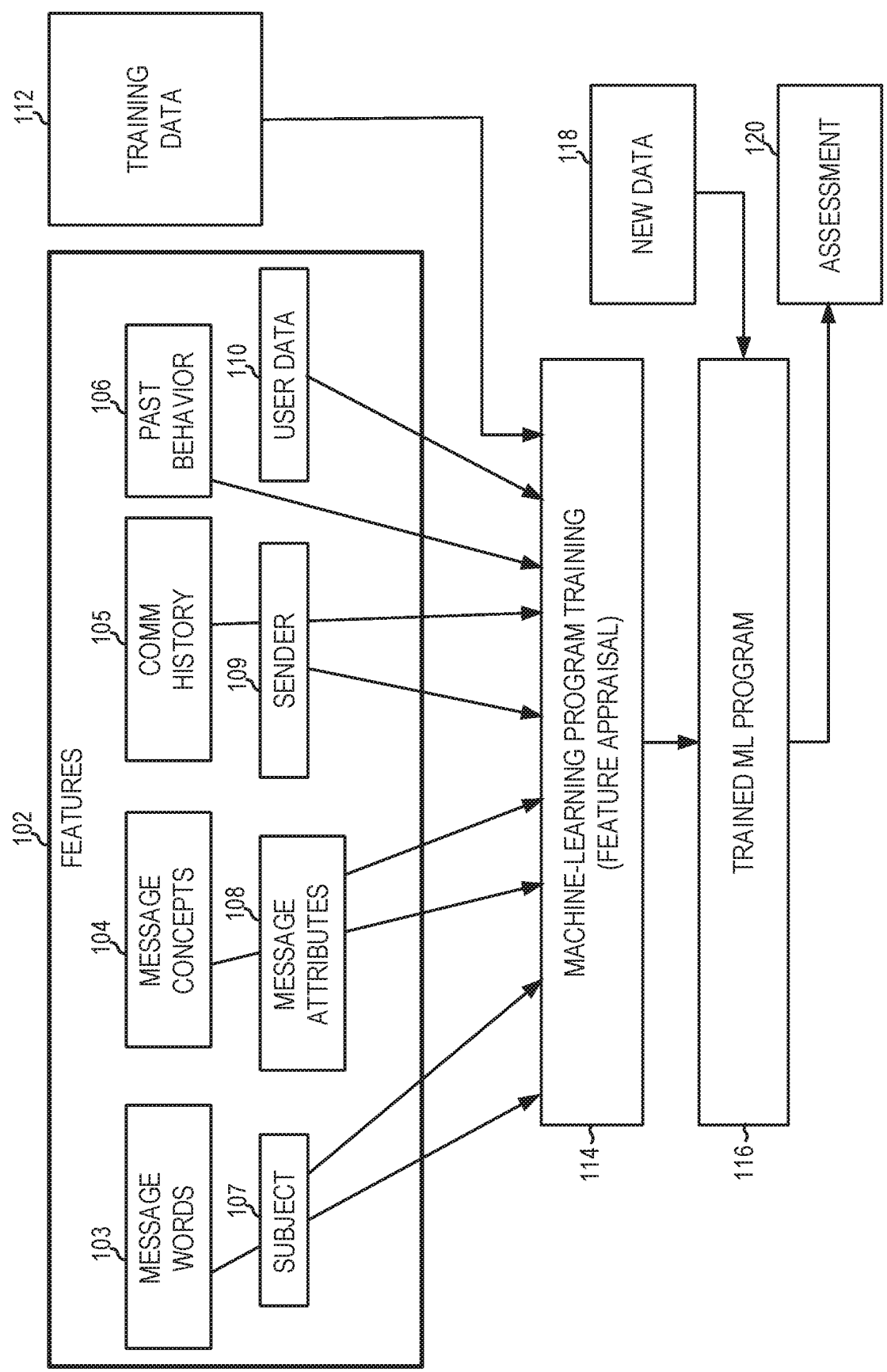
FIG. 1 illustrates the training and use of a machine-learning program, in accordance with some embodiments.

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses neural networks trained by homographic augmentation.

According to some aspects of the technology described herein, an event extraction training apparatus comprises processing circuitry and memory. The processing circuitry accesses a preexisting set of natural language text documents in two or more natural languages. Each natural language text document in at least a portion of the preexisting set is associated with an event. The processing circuitry trains, using the preexisting set of natural language text documents and the associated events, an event encoder to generate additional natural language text documents associated with events. The event encoder leverages a parser in each of the two or more natural languages. The processing circuitry generates, using the event encoder, the additional natural language text documents associated with the events. The processing circuitry trains, using the preexisting set of natural language text documents and the additional natural language text documents generated by the event encoder, an event extraction engine to extract events from natural language texts in the two or more natural languages. The event extraction engine leverages the parser in each of the two or more natural languages. The processing circuitry provides an output representing the trained event extraction engine.

According to some aspects of the technology described herein, an event extraction inferencing apparatus comprises processing circuitry and memory. The processing circuitry receives a new natural language text. The processing circuitry identifies, using an event extraction engine, a new event in the new natural language text. The processing circuitry provides an output representing the new event. The event extraction engine is trained by accessing, at a training apparatus, a preexisting set of natural language text documents in two or more natural languages. Each natural language text document in at least a portion of the preexisting set is associated with an event. The new natural language text is in one of the two or more natural languages. The event extraction engine is trained by training, using the preexisting set of natural language text documents and the associated events, an event encoder to generate additional natural language text documents associated with events. The event encoder leverages a parser in each of the two or more natural languages. The event extraction engine is trained by generating, using the event encoder, the additional natural language text documents associated with the events. The event extraction engine is trained by training, using the preexisting set of natural language text documents and the additional natural language text documents generated by the event encoder, the event extraction engine to extract events from natural language texts in the two or more natural languages. The event extraction engine leverages the parser in each of the two or more natural languages.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, Extracting events from natural language documents may be desirable, for example, to create a repository of events or increase the searchability of the documents. Natural language documents may describe events in many different ways, especially if the documents are in different natural languages (e.g., English, French, Russian, Chinese, etc.). For example, birth event can be described as: "John Johnson was born at ABC Medical Center on Mar. 30, 2019," "Judy had a son, John, on Mar. 30, 2019," or, in French, "John est né le 30 mars 2019." Mapping all of these to the same event—birth [event type], John [agent], Mar. 30, 2019 [date]—may be challenging. As used herein, the term "document" may include the full text in a file (or other data structure) or a portion of a file (or other data structure), such as a phrase or a sentence within the file (or other data structure).

Some aspects of the technology described herein are directed to training a machine (e.g., using neural networks) to extract events from natural language texts in the two or more natural languages. Some aspects of the technology described herein are directed to using the machine to extract the events from the natural language text in the two or more languages.

In some examples, an event is a real-world occurrence that includes trigger word(s) and argument(s). An event may be expressed in any natural language and in any form in accordance with formal or colloquial grammar of the natural language. In one example, a natural language text is provided as follows: "Marie flew to Atlanta on February $1^{st}$. She was accompanied by her husband, Ted." This is a travel event, as indicated by the trigger word "flew" and the surrounding context. A structured datapoint representing this event may be as follows:

Event 1
Type: Travel
Subtype: Flight
Traveler: Marie
Traveler: Ted
Date: 02/01/????
Origin: Unknown
Destination: Atlanta In event and event argument extraction, a natural language ("unstructured") text such as, in the example above: "Marie flew to Atlanta on February $1^{st}$ . . . she was accompanied by her husband, Ted," is converted to a structured data point that reflects the type of event (e.g., travel) and its arguments (e.g., who, what, when, where, etc.). An example of the structured data point is the "Event 1" data point above.

Such a data point may be stored in a knowledge base with many such similar (and different) events. Such a knowledge base can be automatically queried to find all instances of Marie travelling, people flying to Atlanta on a given date, and the like. A list may be returned with all or a portion of the relevant events. It may be difficult to make such a query directly on unstructured text.

Event extraction is a difficult task due to all of the different ways that events can be described in natural language. Some aspects extract events and their arguments in the same way across a variety of languages. A number of natural language processing techniques are used to make the task more accurate. Some techniques for event and event argument extraction use supervised machine learning techniques to model and predict event types and arguments. Word embeddings are useful in this task because they help to identify words that may be "triggers" (the word flew in the example above) or arguments of events, even if the machine has not encountered these words before in association with a particular event. Word embeddings help the machine to generalize its models to unseen words or unseen structures. Word embeddings that have been trained in a cross-lingual setting are useful for generalizing event extraction models to additional languages. That is, some aspects can combine labeled event data from, for example, English and French, simultaneously learning that forms of the words "fly" (in English) and "voler" (in French) are likely to indicate an event of type Travel and subtype Flight.

In some cases, generating word embeddings that incorporate more semantic and syntactic information may improve the accuracy of event type and event argument extraction. Adding this information may help to overcome the sparsity of labeled data that is provided for supervised machine learning techniques. Once encoded in the word embeddings, the syntactic and semantic information becomes implicitly available as features to the neural networks that are used to extract event types and arguments.

The functional operation of the resulting rich word embeddings is that the resulting rich word embeddings are included as features in event type and event argument extraction. Again, some aspects use neural networks to model and then predict the words that participate in events, as described in the background information section. The data used to train the neural networks are texts that have been annotated with the correct answers. Each word in the sentence is marked as being part of a trigger word (and if so, the event type and subtype associated with it), or as part of an event argument. Some aspects train a neural network to model these annotations using only words as features. Due to the sparsity of the annotations, which are expensive and time-consuming to produce and therefore in short supply for most domains, the words alone are, in some cases, not sufficient to properly train a neural network to correctly predict event types and event arguments. The use of word embeddings (lexically trained) might increase accuracy. Some aspects use the linguistically rich, cross-lingual word embeddings described above to further increase the accuracy of the event type and event argument extraction neural network models. The additional information encoded in the richly trained word embeddings gives the neural network more basis on which to make its predictions, even with fewer examples.

The disclosed technology may be used in the downstream tasks of event type and event argument extraction. The resulting embeddings may also be useful in other natural language processing tasks, such as relation extraction, document retrieval, abstractive summarization, or other forms of natural language generation.

The training of word embeddings is discussed below. Some aspects incorporate rich linguistic features into a continuous vector-space representations of words ("word embeddings") and phrases to improve their utility in event type and event argument extraction in a cross-lingual setting. Typically, word embeddings use only lexical features, that is, the values making up the numeric vector for each word are reflective of other words frequently found in their vicinity. With some aspects, the values of the numeric vector may also reflect semantic and syntactic characteristics of the word and the surrounding words. This is achieved by first performing linguistic analyses such as sentence parsing, dependency parsing, and semantic role labeling over the text, and then performing probabilistic alignment of words across languages. The algorithm that derives the vector representations uses this information in determining the values for each word. In this way, the embedding contains not only information about lexical frequency, but much more information about the context and usage of each word. This may provide a benefit to downstream tasks that use the word embeddings as predictive features, for example, for event extraction.

In word embedding detection, a neural network is trained to predict the presence of a word w given some number of words W found in its vicinity. (Alternatively, the surrounding words are predicted based on the presence of word w, with the same effect) At the conclusion of training this neural network, each word in the corpus is associated with a high-dimensional vector of real values, which are the activations of the final layer of the trained neural network when the neuron representing that word in the input is activated.

This high-dimensional, real-valued vector, termed a word embedding, is very useful in a variety of tasks related to natural language processing, such as text categorization, named entity recognition, summarization, and relationship and event extraction.

For some word embeddings, some aspects train a neural network model to make predictions about the text and its annotations. There are multiple algorithms to train such a model. Some aspects are directed to the inclusion of rich linguistic annotations in this or any other approach to training a neural network to create word embeddings.

At each timestep t of training a neural network, a set of neighboring words is presented to activate the first layer of the network. The last layer of the network makes a prediction about the following or missing word. If the prediction is wrong, the weights of the nodes of the middle and final layers are adjusted so that the correct word is more likely to be predicted when presented with the same context set. For instance, some aspects present the words Johnny, the, and apple, and train the neural network to predict the word ate. This process is repeated many times with millions of word combinations. After many iterations, the weights have been adjusted so that the correct word is predicted most of the time. At this point, the network has been trained. For each word in the vocabulary, some aspects activate the network and retrieve the values of the last layer of the network, which is of a fixed dimensionality much smaller than the size of the vocabulary. This is a real-valued vector that represents the word in "semantic space." It has been shown that vectors with a small cosine distance between them are semantically similar.

Some aspects include linguistic annotations in the algorithm by causing the neural network to predict not just a word at each timestep, but a word and any annotations associated with that word. Some aspects begin with a natural language text. Some aspects use existing tools to derive the parse tree, dependency structure, semantic roles, named entities, word senses, and potentially other forms of linguistic knowledge for each sentence in the texts. For instance, some aspects use a pre-trained statistical parser to infer part of speech and grammatical associations between each word of the sentence, producing a parse tree for the sentence. Dependency trees similarly encode grammatical relations between words or phrases of the sentence, and are produced by applying a pre-trained model to the sentence and predicting the correct tree for the sentence. Semantic role labeling assigns a label to the arguments of predicates; for instance, assigning the labels "Agent" and "Patient" to the terms "Johnny" and "apple" in the phrase "Johnny ate the apple." Again, this is performed by applying a pre-trained model to the sentence to produce structured output, or linguistic annotations. These independent tools are trained and applied in a language-specific fashion. Some aspects perform this process for multiple texts. As the task is multi-lingual, some aspects use texts and tools from more than one language. Some aspects use the outcomes to create richer word embeddings.

In training the neural network, the context includes these annotations in addition to the words. To continue the previous example, some aspects present information such as <Johnny, Agent>, <the, 0>, <apple, Patient> as input, and train the neural network to predict the outcome <ate, predicate>. This process can be performed with each type of linguistic annotation separately, or combining multiple types of linguistic annotation at both training and prediction time. Alternatively, some aspects present the linguistic annotation as part of the input features, but only cause the lexical item (ate) as the outcome. Some aspects are directed to determining the ideal combination and approach to training these linguistically rich cross-lingual word embeddings so as to best improve the downstream task of event type and event argument extraction.

There are multiple algorithms for training word embeddings, for instance, context bag-of-words (CBOW) or skip-gram methods. The neural network architecture (number of layers and nodes or other parameters) may change. These alternatives are not crucial to the invention. Other forms of linguistic information not mentioned above could be included in this training technique.

Some aspects apply rich linguistic annotations via pre-trained, language-specific models to natural language text input before training word embedding models. The resulting vectors encode additional syntactic or semantic information above and beyond that which is encoded when the training is performed over unannotated words or phrases.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
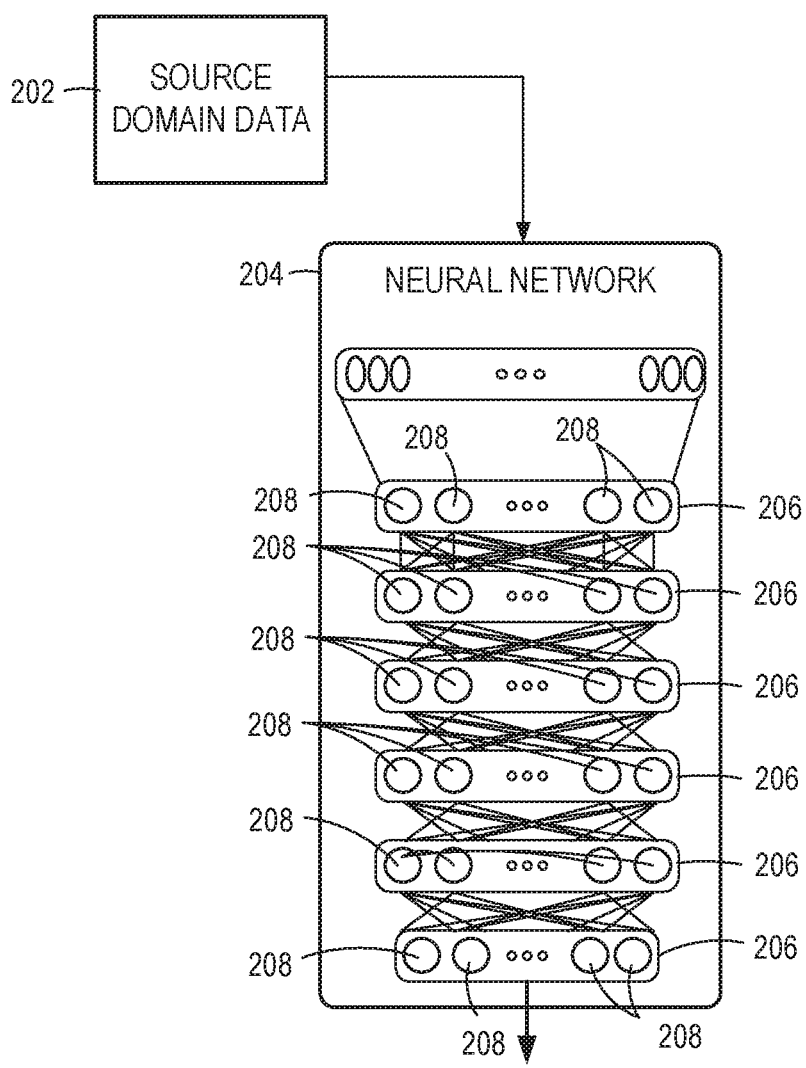
FIG. 2 illustrates an example neural network, in accordance with some embodiments.
Figure 2:
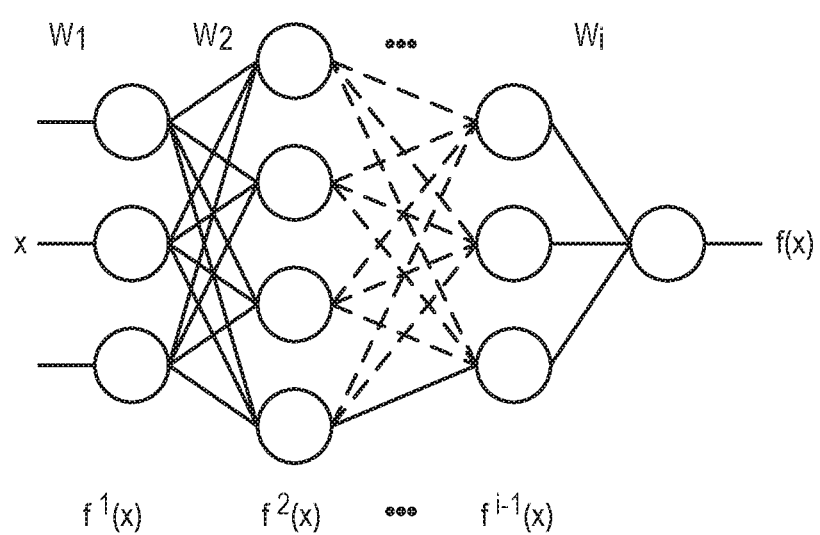

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
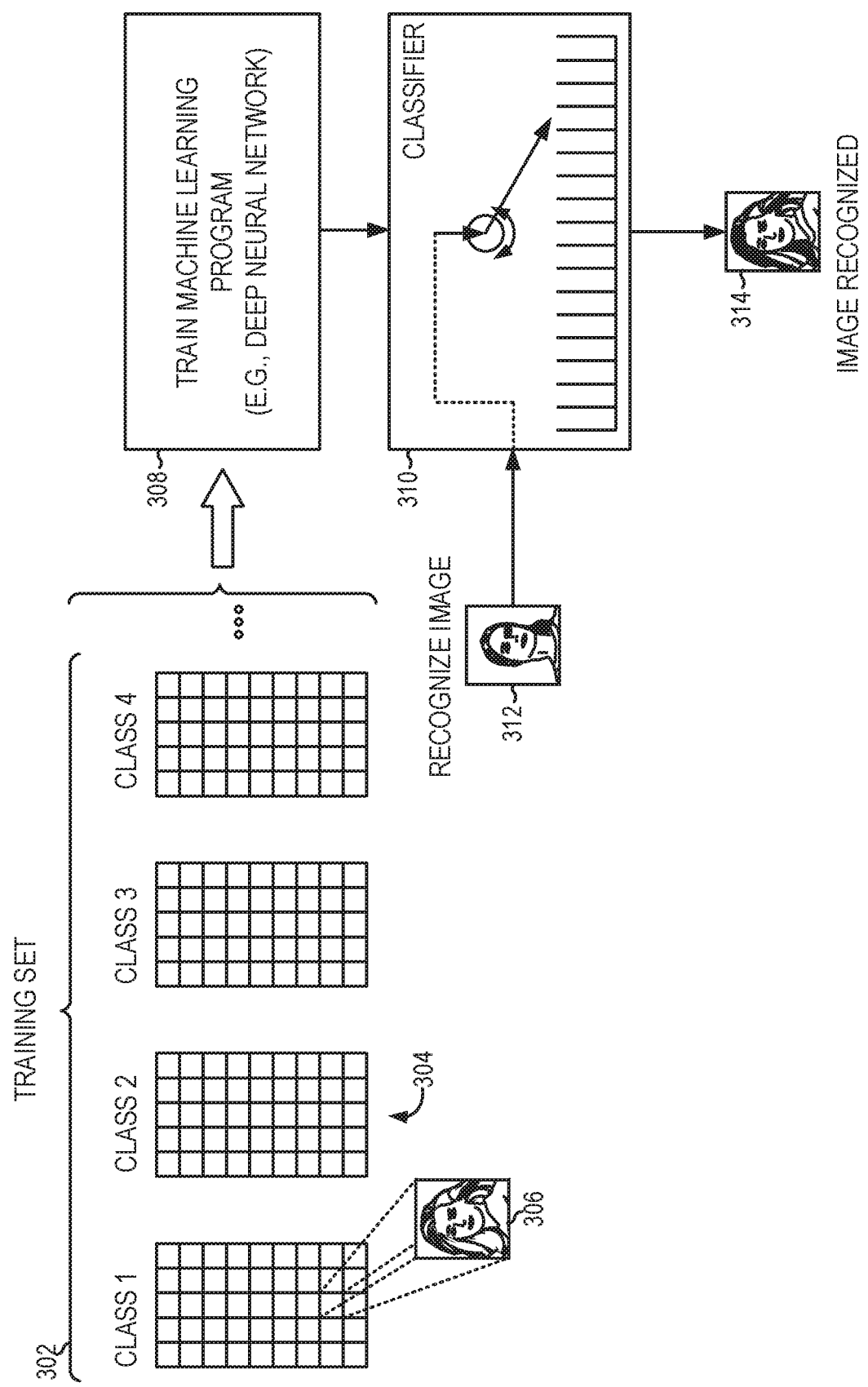
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
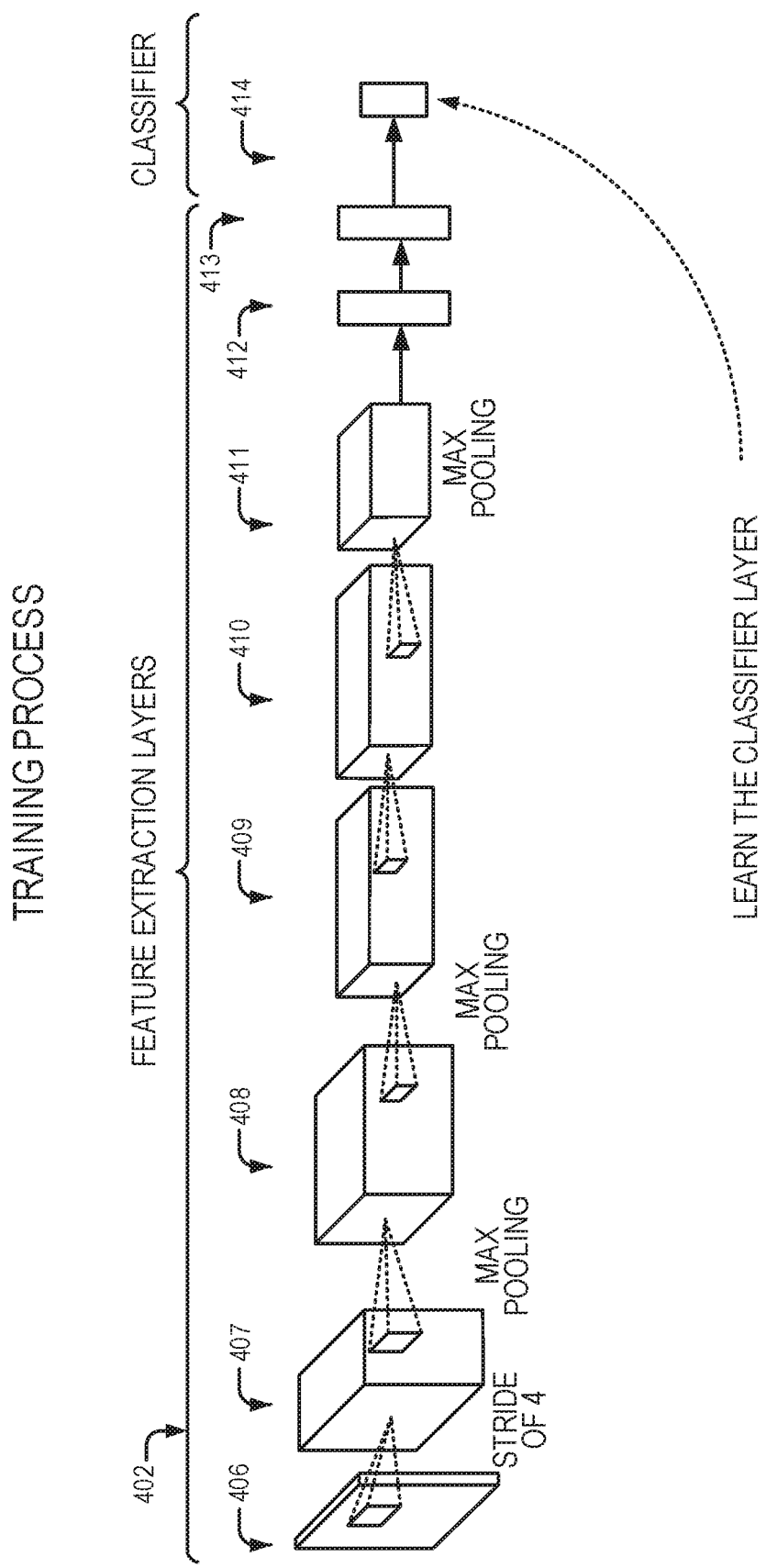
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
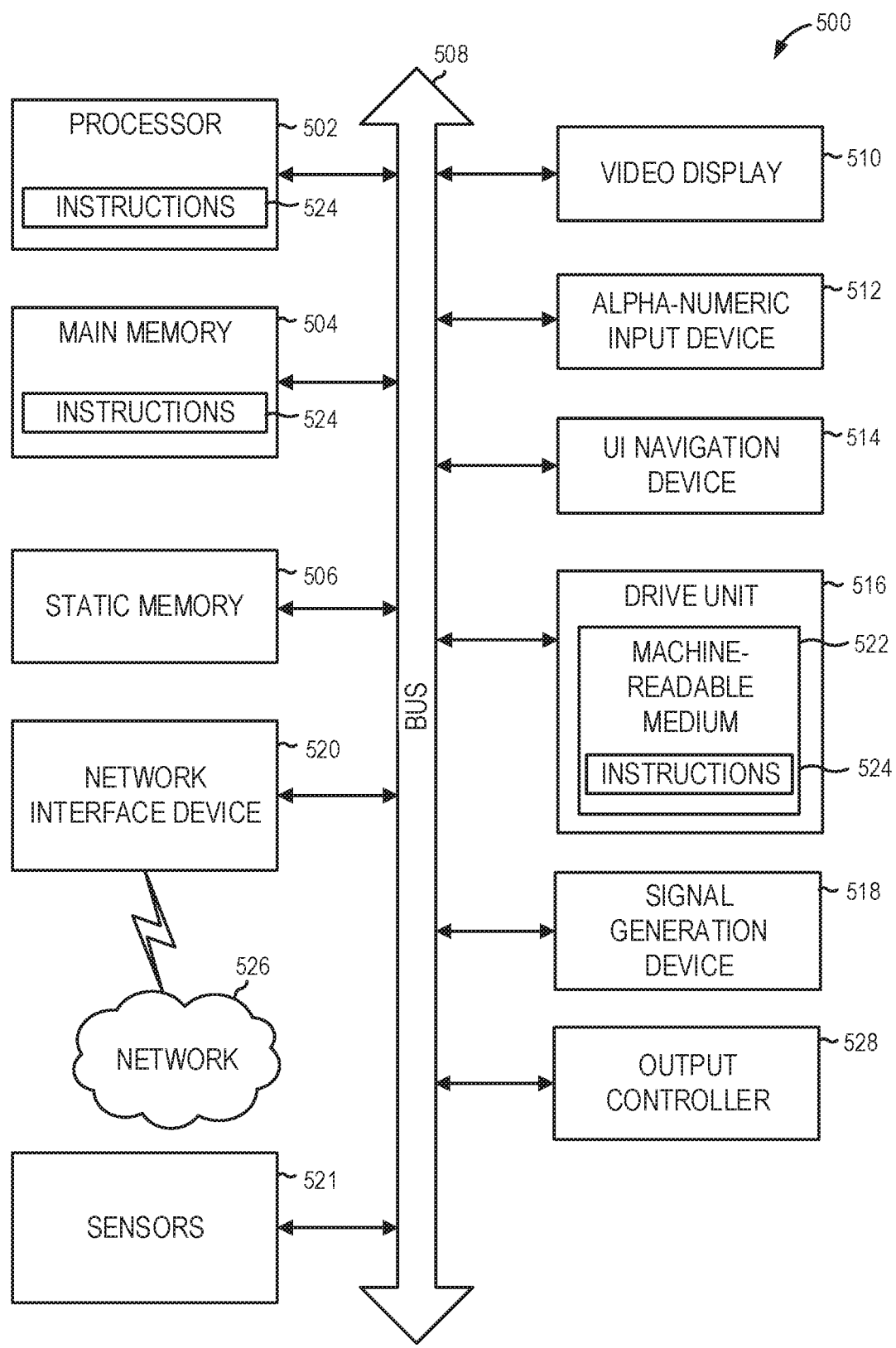
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Aspects of the present invention may be implemented as part of a computer system. The computer system may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 6A:
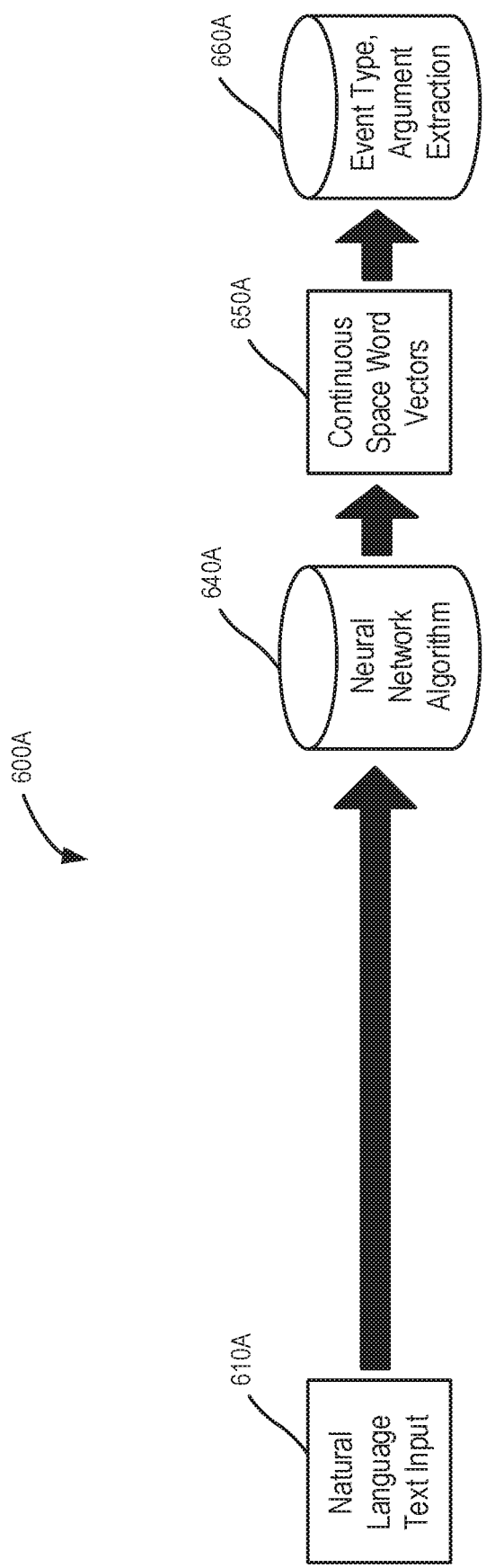
FIG. 6A illustrates a first example workflow for creating and using word embeddings for event extraction, in accordance with some embodiments.
Figure 6B:
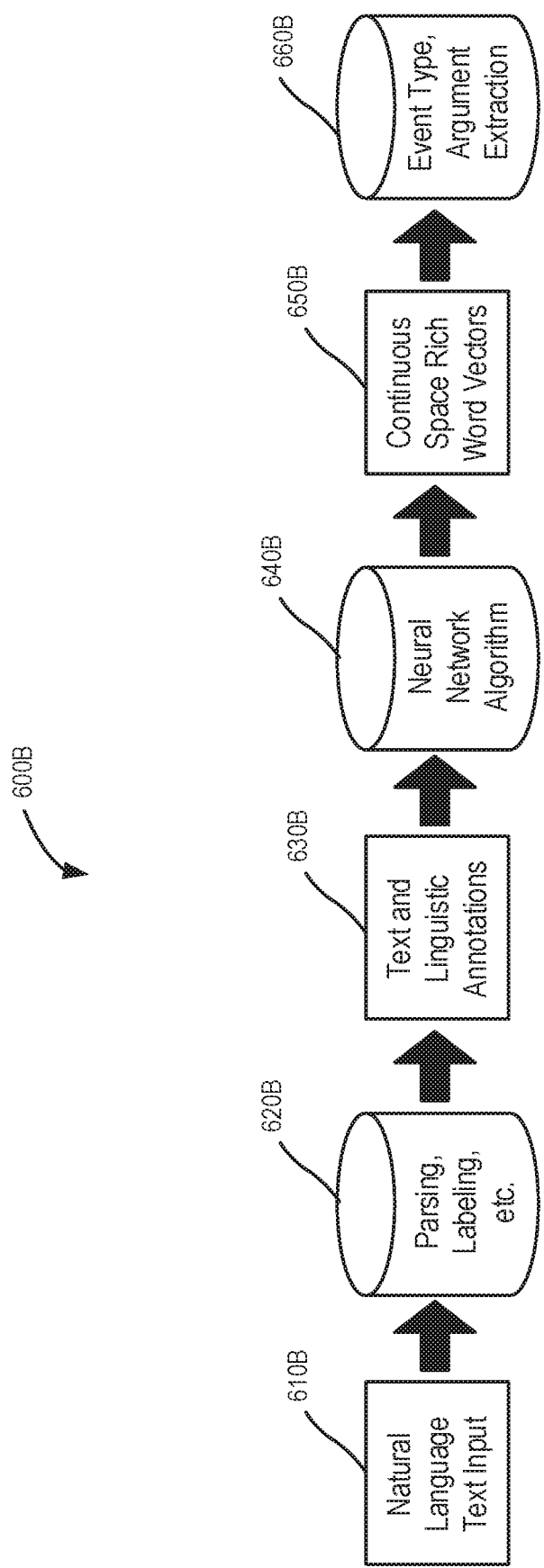
FIG. 6B illustrates a second example workflow for creating and using word embeddings for event extraction, in accordance with some embodiments.

FIG. 6A illustrates a first example workflow 600A for creating and using word embeddings for event extraction, in accordance with some embodiments. FIG. 6B illustrates a second example workflow 600B for creating and using word embeddings for event extraction, in accordance with some embodiments.

The workflow 600A represents a first approach to creating and using word embeddings for event type and event argument extractions. The workflow 600B represents annotating the typical input with linguistic annotations before training the word embeddings model. The more informative word embeddings may, in some cases, provide greater accuracy in event extraction than lexical-only word embeddings.

As shown in FIG. 6A, in the workflow 600A, a natural language text input 600A is provided to a neural network algorithm 640A. The neural network algorithm 640A generates continuous space word vectors 650A, which are used for event type and argument extraction 660A.

FIG. 6B is similar to FIG. 6A, with added blocks 620B and 630B between blocks 610B and 640B. As shown in FIG. 6B, in the workflow 600B, a natural language text input 600B is used for parsing, labeling, and the like 620B. The resulting data is combined with text and linguistic associations 630. The text and linguistic associations 630 are provided to a neural network algorithm 640B. The neural network algorithm 640B generates continuous space rich word vectors 650B, which are used for event type and argument extraction 660B.

Figure 7:
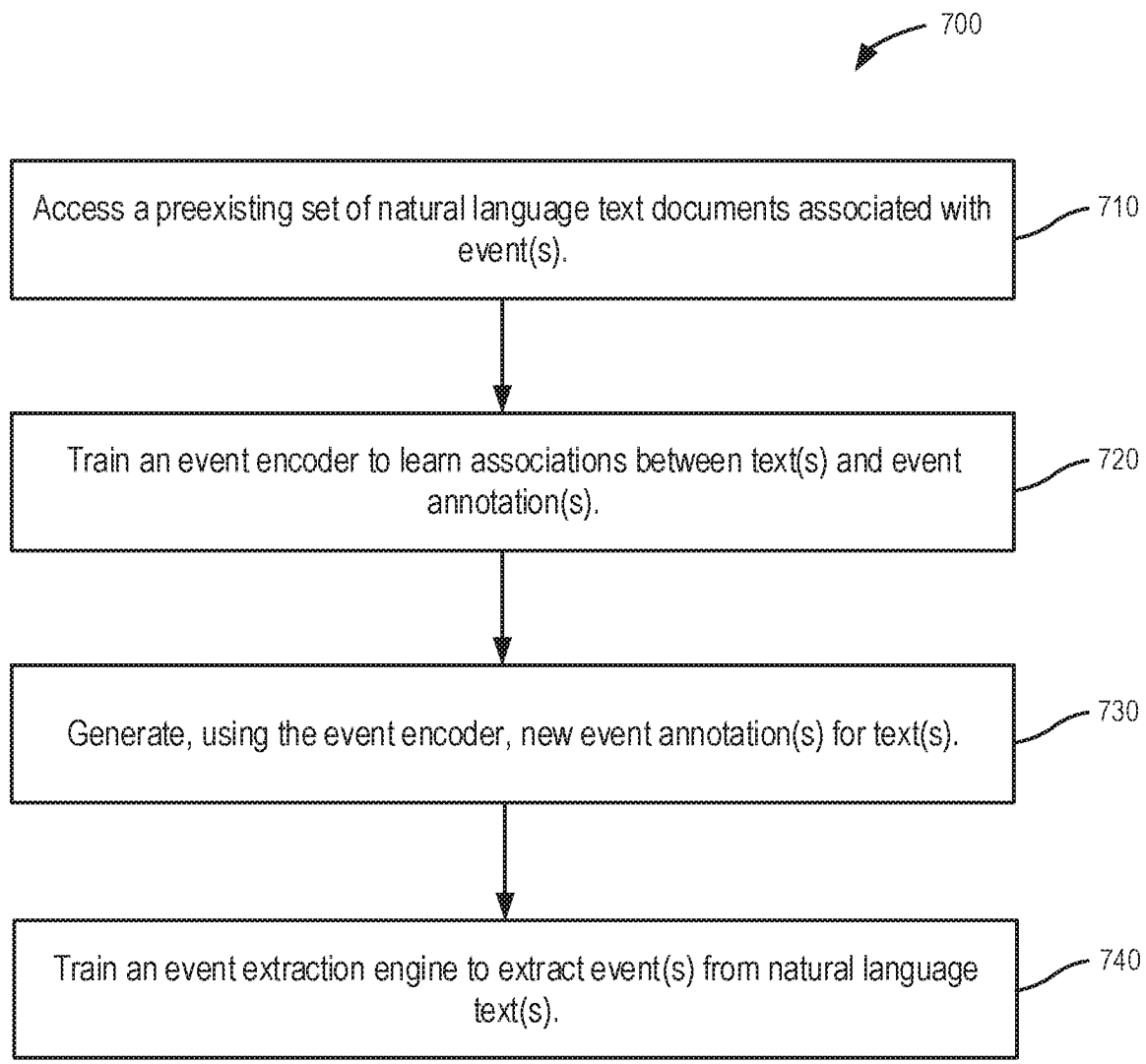
FIG. 7 is a flow chart of an event extraction training method, in accordance with some embodiments.

FIG. 7 is a flow chart of an event extraction training method 700, in accordance with some embodiments. The method 700 may be implemented at a training computing machine (or multiple training computing machines).

At operation 710, the training computing machine accesses a preexisting set of natural language text documents in two or more natural languages. Each natural language text document in at least a portion of the preexisting set is associated with an event. In some cases, some of the natural language text documents are associated with multiple events. As used herein, the term "event" encompasses both a single event and multiple events, unless explicitly specified otherwise.

Each event may include one or more trigger words and one or more arguments. For example, the text, "Johnny ate the apple," represents an eating event, where the trigger word is "ate," and the arguments are <Johnny, Agent> and <apple, Patient>. The one or more arguments may include one or more of: an agent/subject of the event, a patient/object of the event, a geographic location of the event, a time of the event, and an artifact of the event. Examples of artifacts include: "Cindy funded the project with <$1,000,000>," and Fred killed Jack using <a knife>. The one or more trigger words may include one or more verbs representing an action of the event. Alternatively, trigger word(s) may be noun(s) or adjective(s), such as: "The <attack> took place," and "The <bankrupt> company was forced to . . . "

In some cases, each event is represented as a numeric vector representing the one or more trigger words and the one or more arguments.

At operation 720, the training computing machine trains, using the preexisting set of natural language text documents and the associated event(s), an event encoder to learn associations between text(s) and event annotation(s). The event encoder leverages a parser in each of the two or more natural languages. The parser may be a grammatical parser or a semantic parser.

Different types of grammatical and/or semantic parsers may be used. Syntactic parsing may be used to identify verb phrases, preposition attachments, and the like. Dependency parsing may be used to identify the subject, the object, and the like. A semantic role labeling (SRL) parser may be used to identify the roles of words/ phrases in the document. For example, in the sentence, "John opened Bill's door with his key", the SRL parser may identify "John" as Agent, "door" as Theme, and "key" as Instrument. A named entity recognition (NER) parser may be used to identify things like Person, Organization, Locations, Time, Weapon, and the like. For example, in the sentence, "John Rice killed Mary with a knife," the NER parser may recognize: Person [John Rice] killed Person [Mary] with a Weapon [knife]."

At operation 730, the training computing machine generates, using the event encoder, new event annotations for texts.

Figure 8:
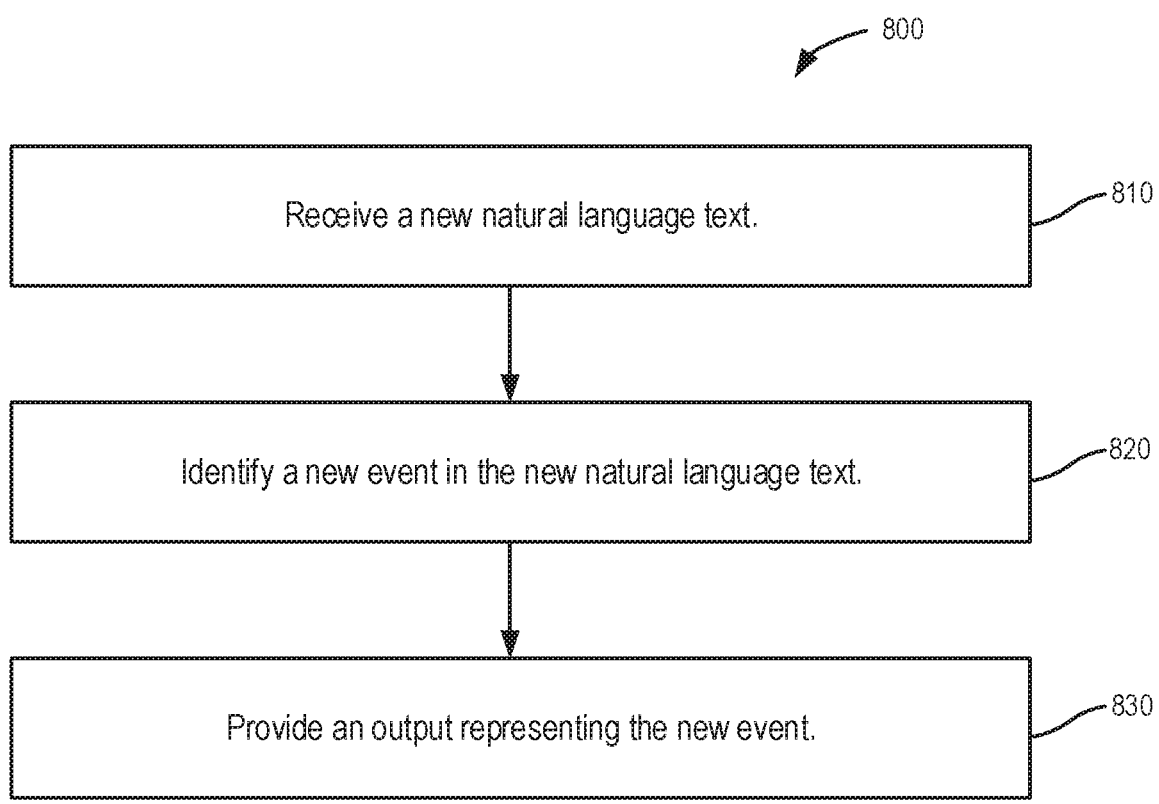
FIG. 8 is a flow chart of an event extraction inferencing method, in accordance with some embodiments.

At operation 740, the training computing machine trains, using the preexisting set of natural language text documents and the new event annotations for the texts generated by the event encoder, an event extraction engine to extract event(s) from natural language texts in the two or more natural languages. The event extraction engine leverages the parser in each of the two or more natural languages. The training computing machine provides an output representing the trained event extraction engine. For example, the trained extraction engine may be provided for inferencing (e.g., as shown in FIG. 8) at an inferencing computing machine (or multiple inferencing computing machines). In some aspects, the technology disclosed herein leverages iterative (self) training across multiple languages, leveraging automatic natural language processing (NLP) analyses in these languages. Some aspects of the technology may include a kind of self-training. The training computing machine may do an initial training, use it to create an expanded data set, and then train a second time on that.

FIG. 8 is a flow chart of an event extraction inferencing method 800, in accordance with some embodiments. The method 700 may be implemented at an inferencing computing machine (or multiple inferencing computing machines). The inferencing computing machine may be different from or the same as the training computing machine used to implement the training method 700.

At operation 810, the inferencing computing machine receives a new natural language text in one of the two or more natural languages.

At operation 820, the inferencing computing machine identifies, using the event extraction engine (which was trained using the training method 700), a new event in the new natural language text.

At operation 830, the inferencing engine provides an output representing the new event. For example, the new event and the new natural language text may be provided to a data repository (e.g., a database or other data storage unit) for storage together in the data repository.

Some advantages of some embodiments include that an event extraction engine may be trained and implemented in a multi-lingual environment, where there is too little data for adequate training of a certain type in some of the languages. For example, a training dataset may include an adequate number (e.g., >1000) of travel events in English, an inadequate number (e.g., <100) of travel events in French, and inadequate number of birth/death events in English and an adequate number of birth/death events in French. Using the training techniques described herein, the event extraction engine may be trained to identify travel events in English, travel events in French, birth/death events in English, and birth/death events in French.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An event extraction training apparatus, the apparatus comprising:
   processing circuitry and memory; the processing circuitry to:
   access a preexisting set of natural language text documents in two or more natural languages, wherein each natural language text document in at least a portion of the preexisting set is associated with an event;
   train, using the preexisting set of natural language text documents and the associated events, an event encoder to learn associations between texts and event annotations, wherein the event encoder leverages a parser in each of the two or more natural languages, wherein the preexisting set of natural language text documents comprises more than a training adequacy threshold number of texts annotated with a first event type in a first natural language and fewer than a training inadequacy threshold number of texts annotated with the first event type in a second natural language, wherein the training inadequacy threshold number is less than the training adequacy threshold number;
   generate, using the event encoder, new event annotations for texts;
   train, using the preexisting set of natural language text documents and the new event annotations for the texts generated by the event encoder, an event extraction engine to extract events from natural language texts in the two or more natural languages, wherein the event extraction engine leverages the parser in each of the two or more natural languages; and
   provide an output representing the trained event extraction engine, wherein the trained event extraction engine is trained to extract events of the first event type from texts in the first natural language and texts in the second natural language.

2. The event extraction training apparatus of claim 1, wherein each event comprises one or more trigger words and one or more arguments.

3. The event extraction training apparatus of claim 2, wherein the one or more arguments comprise one or more of: an agent/subject of the event, a patient/object of the event, a geographic location of the event, a time of the event, and an artifact of the event.

4. The event extraction training apparatus of claim 2, wherein the one or more trigger words comprise one or more verbs representing an action of the event.

5. The event extraction training apparatus of claim 2, wherein each event is represented as a numeric vector representing the one or more trigger words and the one or more arguments.

6. The event extraction training apparatus of claim 1, wherein the processing circuitry is further to:
- receive a new natural language text in one of the two or more natural languages;
- identify, using the event extraction engine, a new event in the new natural language text; and
- provide an output representing the new event.

7. The event extraction training apparatus of claim 1, wherein the parser comprises one or more of: a grammatical parser and a semantic parser.

8. An event extraction inferencing, apparatus, the apparatus comprising:
- processing circuitry and memory; the processing circuitry to:
- receive a new natural language text;
- identify, using an event extraction engine, a new event in the new natural language text; and
- provide an output representing the new event, wherein the event extraction engine is trained by:
- accessing, at a training apparatus, a preexisting set of natural language text documents in two or more natural languages, wherein each natural language text document in at least a portion of the preexisting set is associated with an event, and wherein the new natural language text is in one of the two or more natural languages;
- training, using the preexisting set of natural language text documents and the associated events, an event encoder to learn associations between texts and event annotations, wherein the event encoder leverages a parser in each of the two or more natural languages, wherein the preexisting set of natural language text documents comprises more than a training adequacy threshold number of texts annotated with a first event type in a first natural language and fewer than a training inadequacy threshold number of texts annotated with the first event type in a second natural language, wherein the training inadequacy threshold number is less than the training adequacy threshold number;
- generating, using the event encoder, new event annotations for texts; and
- training, using the preexisting set of natural language text documents and the new event annotations for the texts generated by the event encoder, the event extraction engine to extract events from natural language texts in the two or more natural languages, wherein the event extraction engine leverages the parser in each of the two or more natural languages, wherein the trained event extraction engine is trained to extract events of the first event type from texts in the first natural language and texts in the second natural language.

9. The event extraction inferencing apparatus of claim 8, wherein each event comprises one or more trigger words and one or more arguments.

10. The event extraction inferencing apparatus of claim 8, wherein the parser comprises one or more of: a grammatical parser and a semantic parser.

11. A non-transitory machine-readable medium storing instructions which, when executed by processing circuitry of one or more machines, cause the processing circuitry to:
- access a preexisting set of natural language text documents in two or more natural languages, wherein each natural language text document in at least a portion of the preexisting set is associated with an event;
- train, using the preexisting set of natural language text documents and the associated events, an event encoder to learn associations between texts and event annotations, wherein the event encoder leverages a parser in each of the two or more natural languages wherein the preexisting set of natural language text documents comprises more than a training adequacy threshold number of texts annotated with a first event type in a first natural language and fewer than a training inadequacy threshold number of texts annotated with the first event type in a second natural language, wherein the training inadequacy threshold number is less than the training adequacy threshold number;
- generate; using the event encoder; new event annotations for texts;
- train, using the preexisting set of natural language text documents and the new event annotations for the texts generated by the event encoder, an event extraction engine to extract events from natural language texts in the two or more natural languages, wherein the event extraction engine leverages the parser in each of the two or more natural languages; and
- provide an output representing the trained event extraction engine, wherein the trained event extraction engine is trained to extract events of the first event type from texts in the first natural language and texts in the second natural language.

12. The machine-readable medium of claim 11, wherein each event comprises one or more trigger words and one or more arguments.

13. The machine-readable medium of claim 12, wherein the one or more arguments comprise one or more of: an agent/subject of the event, a patient/object of the event, a geographic location of the event, a time of the event, and an artifact of the event.

14. The machine-readable medium of claim 12, wherein the one or more trigger words comprise one or more verbs representing an action of the event.

15. The machine-readable medium of claim 12, wherein each event is represented as a numeric vector representing the one or more trigger words and the one or more arguments.

16. The machine-readable medium of claim 11, wherein the processing circuitry is further to:
- receive a new natural language text in one of the two or more natural languages;
- identify, using the event extraction engine, a new event in the new natural language text; and
- provide an output representing the new event.

17. The machine-readable medium of claim 11, wherein the parser comprises one or more of: a grammatical parser and a semantic parser.

18. An event extraction training method, the method comprising:
- accessing a preexisting set of natural language text documents in two or more natural languages, wherein each natural language text document in at least a portion of the preexisting set is associated with an event;
- training, using the preexisting set of natural language text documents and the associated events, an event encoder to learn associations between texts and event annotations, wherein the event encoder leverages a parser in each of the two or more natural languages, wherein the preexisting set of natural language text documents comprises more than a training adequacy threshold number of texts annotated with a first event type in a first natural language and fewer than a training inadequacy threshold number of texts annotated with the first event type in a second natural language, wherein the training inadequacy threshold number is less than the training adequacy threshold number;

generating, using the event encoder, new event annotations for texts;

training, using the preexisting set of natural language text documents and the new event annotations for the texts generated by the event encoder, an event extraction engine to extract events from natural language texts in the two or more natural languages, wherein the event extraction engine leverages the parser in each of the two or more natural languages; and providing an output representing the trained event extraction engine, wherein the trained event extraction engine is trained to extract events of the first event type from texts in the first natural language and texts in the second natural language.

19. The method of claim 18, wherein each event comprises one or more trigger words and one or more arguments.

20. The method of claim 18, wherein the parser comprises one or more of: a grammatical parser and a semantic parser.

21. The event extraction training apparatus of claim 1, wherein the first event type comprises travel events or birth/death events.

22. The event extraction training apparatus of claim 1, wherein the training adequacy threshold number is 1000, and wherein the training inadequacy threshold number is 100.

* * * * *